UNITED STATES PATENT OFFICE.

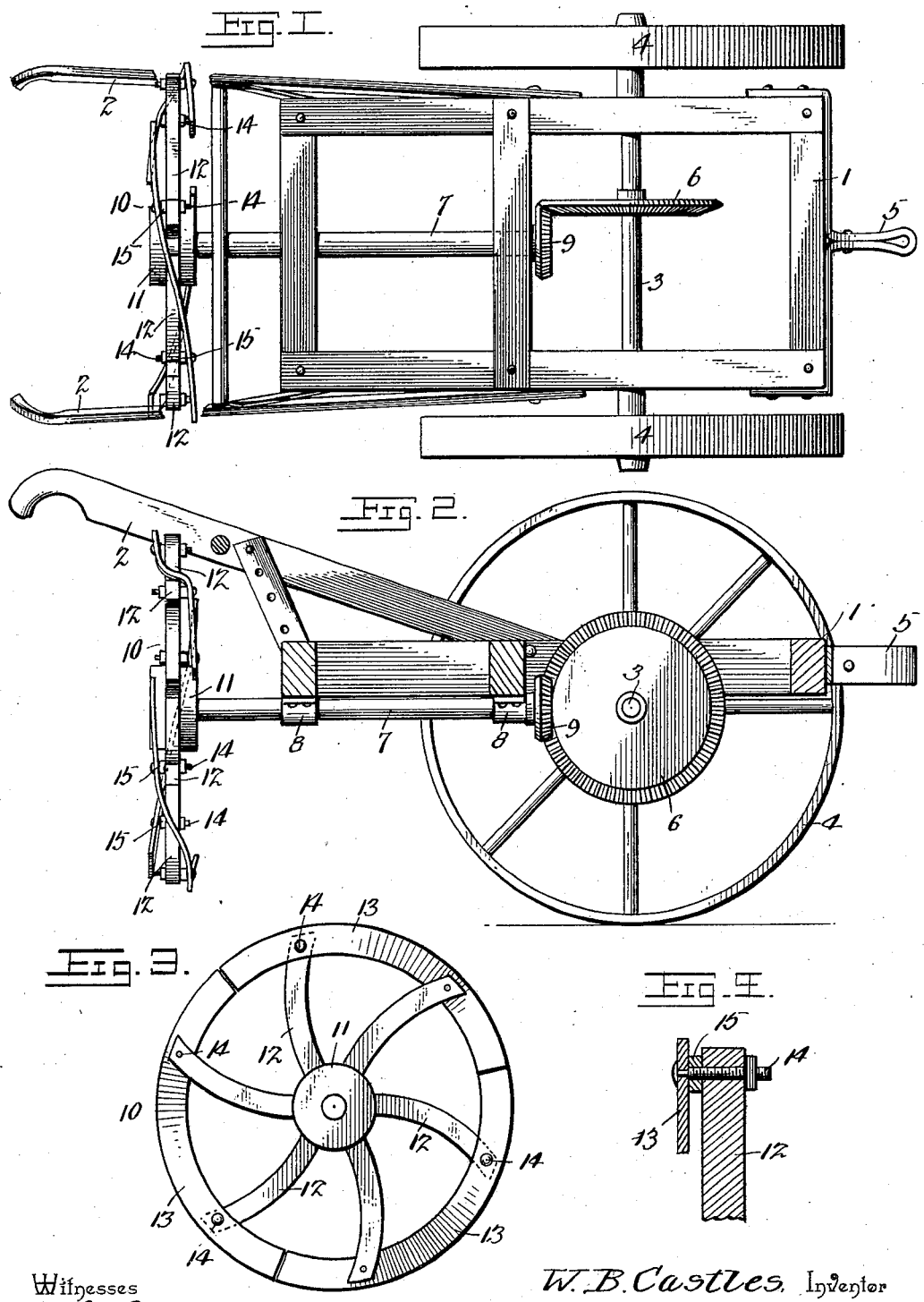

WILLIAM B. CASTLES, OF HICKORY, SOUTH CAROLINA, ASSIGNOR TO CAROLINA AGRICULTURAL IMPLEMENT MANUFACTURING COMPANY.

COTTON-CHOPPER.

SPECIFICATION forming part of Letters Patent No. 711,417, dated October 14, 1902.

Application filed November 29, 1901. Serial No. 84,081. (No model.)

*To all whom it may concern:*

Be it known that I, WILLIAM B. CASTLES, a citizen of the United States, residing at Hickory, in the county of York and State of South Carolina, have invented a new and useful Cotton-Chopper, of which the following is a specification.

My invention is an improved cotton-chopper; and it consists in the peculiar construction and combination of devices hereinafter fully set forth and claimed.

In the accompanying drawings, Figure 1 is a top plan view of a cotton-chopper embodying my improvements. Fig. 2 is a vertical longitudinal sectional view of the same. Fig. 3 is a detail elevation of the chopping-wheel. Fig. 4 is a detail sectional view of the same, showing the means for adjusting the chopping-blades.

In the embodiment of my invention I provide a frame 1, which may be either of the form here shown or of any other suitable construction and is provided with handles 2, which project beyond its rear end. An axle-shaft 3 is mounted transversely of the frame 1, at a suitable distance from the front end thereof. On the ends of the axle-shaft are ground-wheels 4. A suitable clevis 5 is provided at the front end of the frame 1, by means of which a singletree or doubletree may be connected thereto to enable the machine to be drawn by a horse or team. On the said axle-shaft is a beveled gear-wheel 6, which rotates with said axle-shaft.

A longitudinally-disposed shaft 7 is journaled in bearings 8, with which the frame 1 is provided. At the front end of said shaft 7 is a beveled gear-wheel 9, which engages the gear 6. Hence power is communicated from the axle-shaft to the shaft 7.

On the rear end of the shaft 7 is a chopping-wheel 10. The same comprises a hub 11 and a series of pairs of spokes 12. The outer ends of each pair of the spokes are connected together by a segmental chopping-blade 13. The said chopping-blades are disposed obliquely and on opposite sides of the spokes to which they are attached, as shown, and thereby spaces are left between the proximate ends of the chopping-blades. Each chopping-blade is secured to one pair of the spokes by bolts 14, which pass through the blades and through the spokes, and suitable washers 15 may be interposed between the blades and the spokes on the said bolts to adjust and secure the chopping-blades at any required angle. Any suitable number of the washers may be used on each of the bolts. Hence the openings between the proximate ends of the chopping-blades may be formed of any width desired.

In operation the machine is drawn astride of a row of cotton-plants, and it will be understood that the blades of the chopping-wheel can be caused to operate transversely in the soil in the ridge and to chop out the superfluous plants, the openings between the blades leaving "stands" at suitable distances apart, which may be varied at will by using a chopping-wheel of suitable size. In practice I provide each machine with a number of interchangeable chopping-wheels of varying sizes to enable the stands to be left at any desired distance apart.

My improved cotton-chopper is extremely light, cheap, and simple, may be readily operated, and is exceedingly efficient, as I have demonstrated by actual use. Under certain conditions the chopping-wheel may be removed from the shaft 7 and another provided with chopping-hoes substituted in its stead.

Having thus described my invention, I claim—

1. In a machine of the class described, a revoluble chopping-wheel having pairs of spokes, segmental chopping-blades secured, one to each pair of the spokes on opposite sides thereof, whereby openings are formed between the proximate ends of the blades and means to adjust the latter to any desired angle, substantially as described.

2. In a cotton-chopper, a chopping-wheel having pairs of spokes, in combination with segmental chopping-blades disposed each on opposite sides of one pair of the spokes, and bolts and washers to secure said blades to said spokes and to adjust said blades, substantially as described.

In testimony that I claim the foregoing as my own I have hereto affixed my signature in the presence of two witnesses.

WILLIAM B. CASTLES.

Witnesses:
S. W. LUCH,
T. S. R. WARD.